(12) United States Patent
Price

(10) Patent No.: US 10,591,329 B2
(45) Date of Patent: Mar. 17, 2020

(54) REFLECTOR CLAMPING MEMBER AND USE THEREOF

(71) Applicant: Apator Miitors ApS, Aarhus V (DK)

(72) Inventor: James Edward Price, Risskov (DK)

(73) Assignee: Apator Miitors ApS, Aarhus V (DK)

( * ) Notice: Subject to any disclaimer, the term of this patent is extended or adjusted under 35 U.S.C. 154(b) by 0 days.

(21) Appl. No.: 16/308,858

(22) PCT Filed: Jun. 14, 2016

(86) PCT No.: PCT/DK2016/050182
§ 371 (c)(1),
(2) Date: Dec. 11, 2018

(87) PCT Pub. No.: WO2017/215716
PCT Pub. Date: Dec. 21, 2017

(65) Prior Publication Data
US 2019/0154481 A1  May 23, 2019

(51) Int. Cl.
| | | |
|---|---|---|
| *G01F 1/66* | (2006.01) | |
| *G01F 15/14* | (2006.01) | |
| *G01F 15/18* | (2006.01) | |

(52) U.S. Cl.
CPC .............. *G01F 1/662* (2013.01); *G01F 15/14* (2013.01); *G01F 15/18* (2013.01)

(58) Field of Classification Search
CPC ............. G01F 1/66; G01F 15/14; G01F 15/18
See application file for complete search history.

(56) References Cited

U.S. PATENT DOCUMENTS

| | | | |
|---|---|---|---|
| 6,626,049 B1 * | 9/2003 | Ao ........................... | G01F 1/662 73/861.29 |
| 10,107,659 B2 * | 10/2018 | Nagareda ................ | G01F 1/662 |

(Continued)

FOREIGN PATENT DOCUMENTS

| | | |
|---|---|---|
| EP | 2267416 A1 | 12/2010 |
| EP | 2278281 A1 | 1/2011 |
| WO | WO2016012024 A1 | 1/2016 |

OTHER PUBLICATIONS

PCT Search Report & Written Opinion for Application No. PCT/DK2016/050182, dated Dec. 21, 2017, 9 pages.

*Primary Examiner* — Jewel V Dowtin
(74) *Attorney, Agent, or Firm* — Lee & Hayes, P.C.

(57) ABSTRACT

A reflector clamping member (RCM) for fixating an ultrasound reflector (REF) to a flow conduit insert (FCI) of an ultrasonic flow meter (UFM) is disclosed, the reflector clamping member (RCM) comprising a fixation portion (FXN) for fixating the reflector clamping member (RCM) to the flow conduit insert (FCI) and a flexible portion (FLX) for contacting the ultrasound reflector (REF), wherein the flexible portion (FLX) is adapted for supporting at least one side of the ultrasound reflector (REF) so as to clamp the ultrasound reflector (REF) between the flexible portion (FLX) and the flow conduit insert (FCI) when the reflector clamping member (RCM), the ultrasound reflector (REF), and the flow conduit insert (FCI) are assembled. Also, a flow conduit insert assembly (ASY) comprising such reflector clamping member (RCM), an ultrasonic flow meter (UFM) comprising such reflector clamping member (RCM), and a method of fixating an ultrasound reflector (REF) to a flow conduit insert (FCI) are disclosed.

18 Claims, 5 Drawing Sheets

(56) References Cited

U.S. PATENT DOCUMENTS

Figure 1A:
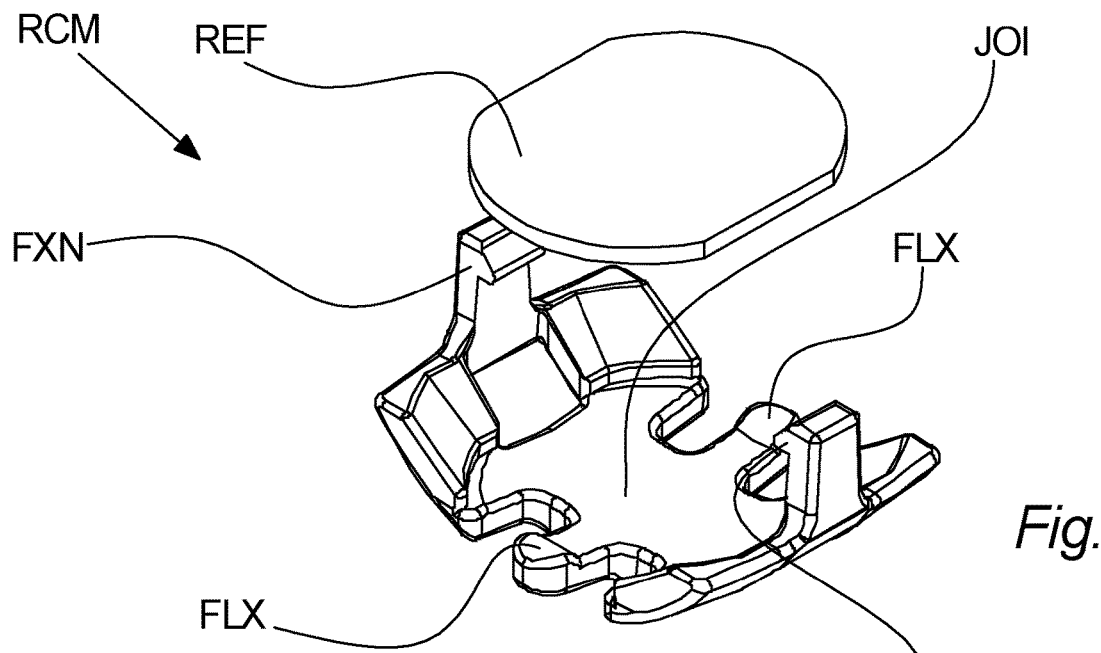

2019/0285451 A1* 9/2019 Tsukigi .................. G01F 15/14
2019/0285454 A1* 9/2019 Koyama ................ G01F 1/662

* cited by examiner

REFLECTOR CLAMPING MEMBER AND USE THEREOF

CROSS REFERENCE TO RELATED APPLICATIONS

This application is a U.S. National Phase Application of International Application No. PCT/DK2016/050182, filed Jun. 14, 2016, which is hereby incorporated by reference in its entirety.

FIELD OF INVENTION

The present invention relates to the field of ultrasonic flow metering, particularly to a reflector clamping member for fixating an ultrasound reflector to a flow conduit insert of an ultrasonic flow meter according to claim 1 and use of such ultrasonic flow member.

BACKGROUND

Different solutions for fixating ultrasound reflectors in ultrasonic flow meters are known. When fixating the ultrasound reflectors to an insert to be positioned in the flow conduit, i.e. where the ultrasound passes through the fluid, such fixation may be relatively complex. However, many of known ultrasonic flow meters may suffer from drawbacks such as expensive production, inaccurate fixation of ultrasound reflectors, or problems with fluctuating flow measurements or decreasing accuracy of flow measurements.

An object of the present invention is to solve one or more of the above drawbacks.

SUMMARY OF THE INVENTION

The present invention relates to a reflector clamping member for fixating an ultrasound reflector to a flow conduit insert of an ultrasonic flow meter, the reflector clamping member comprising a fixation portion for fixating the reflector clamping member to the flow conduit insert and a flexible portion for contacting the ultrasound reflector, wherein the flexible portion is adapted for supporting at least one side of the ultrasound reflector so as to clamp the ultrasound reflector between the flexible portion and the flow conduit insert when the reflector clamping member, the ultrasound reflector, and the flow conduit insert are assembled.

One advantage of the present invention may be that a relatively robust fixation of the ultrasound reflector to the flow conduit insert may be realized with relatively low-cost parts. Specifically, criteria for the dimensional tolerances may be less strict, thus supporting the use of low-cost parts, or the requirements for long-term deformation may be less strict, also supporting the use of low-cost parts. By realizing a fixation of the ultrasound reflector by means of clamping the ultrasound reflector between the flexible part and the flow conduit insert, the flexible portion can compensate for inaccuracies in the dimensions of the reflector clamping member, the ultrasound reflector and the flow conduit insert. The above advantage may be realized while maintaining a relatively simple assembly setup, since the clamping of the ultrasound reflector may be established by means of the reflector clamping member and the flow conduit insert alone and also by allowing the ultrasound reflector to have a relatively simple design. Thus, by avoiding very complicated assembly from multiple parts, production costs can be kept at a lower level.

The reflector clamping member should be understood as any device that can clamp an ultrasound reflector to a flow conduit insert according to the present invention. Thus, the reflector clamping device may be understood as for example a clamp or a fixture. In some embodiments, the reflector clamping member may be formed as a plug, a cap or a cover, whereas in other embodiments the reflector clamping member may be devised to merely facilitate fixation of the ultrasound reflector to the flow conduit insert by clamping the ultrasound reflector between the flexible portion and the flow conduit insert.

Thus, according to the invention it should be understood that by clamping the ultrasound reflector between the flexible portion and the flow conduit insert when the reflector clamping member, the ultrasound reflector, and the flow conduit insert are assembled, the ultrasound reflector is fixated to the flow conduit insert.

In the present context it should be understood that the term "assembled configuration" is intended to mean that the ultrasound reflector, the reflector clamping member, and the flow conduit insert is assembled to clamp and thus fixate the ultrasound reflector between the flow conduit insert and the flexible portion of the reflector clamping member. When in assembled configuration, a flow conduit insert assembly is formed comprising the ultrasound reflector, the reflector clamping member, and the flow conduit insert.

The reflector clamping member of the invention is adapted to clamp an ultrasound reflector to a flow conduit insert. The clamp may be devised in various shapes and sized in order to fit corresponding ultrasound reflectors, which ultrasound reflectors may be available with various dimensions according to the particular application. One example of an ultrasound reflector, which is usable with the reflector clamping member of the invention, is an ultrasound reflector for a utility meter, such as a utility water meter. Such ultrasound reflectors may as an example comprises a reflecting surface having a minimum width of between 1 and 20 millimeter, such as between 5 and 15 millimeter. Also, such ultrasound reflectors may as an example have a thickness of between 0.2 and 3 millimeters, such as between 0.5 and 2 millimeters. However, the reflector clamping member of some embodiments may also be used with larger ultrasound reflectors, e.g. for use with the utility grid; and may also in other embodiments be used with even smaller ultrasound reflectors than exemplified above.

According to the invention, it must be ensured that the flexible portion is adapted to allow contact with the ultrasound reflector, and that the fixation portion is joined with the flexible portion. It should be understood that the flexible portion and the fixation may be joined in various ways. In some embodiments, the reflector clamping member further comprises a joining portion which joins the fixation portion with the flexible portion. Moreover, in other embodiments the flexible portion may be directly joined and connected to the fixation portion. Even further, the flexible portion or parts thereof may be provided as an adjacent part in abutment with the fixation portion and/or the joining portion and may thus be removable therefrom. Even further, it must also be ensured that the flexible portion is adapted for supporting at least one side of the ultrasound reflector so as to clamp the ultrasound reflector between the flexible portion and the flow conduit insert when the reflector clamping member, the ultrasound reflector, and the flow conduit insert are assembled, i.e. assembled to form a flow conduit insert assembly.

The flow conduit insert may restrict the inner space of the flow conduit through which the fluid to be measured can flow. By selectively restricting the flow of fluid between the ultrasonic transducers, the flow velocity of the fluid may be increased locally without inducing too much pressure drop of the fluid across the length of the flow conduit insert. Having an increased flow velocity between the transducers may beneficially increase the accuracy of the measurement of the flow velocity and hence increase the accuracy of the fluid flow calculated on the basis of the measured flow velocity. This increased accuracy may be especially pronounced at lower flow rates, i.e. when the volume of fluid per unit of time is relatively low. The increased accuracy could also be used to exchange electronic components into more cost-conserving versions, without losing accuracy, due to the implemented flow conduit insert.

According to an advantageous embodiment of the invention, the reflector clamping member further comprises a joining portion joining the flexible portion and the fixation portion.

In the present context it should be understood that when the joining portion joins the fixation portion and the flexible portion, the joining portion provides structural connection between the fixation portion and the flexible portion. Thereby, when the reflector clamping member is installed in the flow conduit insert, i.e. when the fixation portion is installed with a corresponding fixation part of the flow conduit insert, the joining portion extends the fixation of the fixation portion to the flexible portion, which in turn clamps and thus fixates the ultrasound reflector to the flow conduit insert.

According to an advantageous embodiment of the invention the flexible portion comprises an elastic portion.

One advantage of the above embodiment may be that a particularly effective claiming of the ultrasound reflector to the flow conduit insert may be provided when using the reflector clamping member of the above embodiment.

In the present context the term "elastic portion" may be understood either as a portion comprising an elastic material, or as a portion having a reduced dimensions giving rise to elasticity. Here, an "elastic material" may in one embodiment be understood as a material having a Young's modulus below 0.5 GPa, such as below 0.1 GPa.

Furthermore, it should be understood that the term "elastic" is understood as being a subset of "flexible". Thus, while an elastic portion would necessarily also be flexible, a flexible portion may not necessarily be elastic. In more detail, the term "flexible" is used to denote that the described part or portion has flexibility and would thus be able to be deformed or bent in response to an applied force. Also, the term "elastic" would require the described part of portion to be able to deform, however, an elastic part or portion would be able to return to its original shape or position.

According to an embodiment of the invention, the flexible portion is an elastic portion.

According to an advantageous embodiment of the invention the flexible portion comprises an elastic material.

The flexible portion may comprise an elastic material thus facilitating the clamping of the ultrasound reflector to the flow conduit insert. Any elasticity of the flexible portion may thus in the above embodiment arise from the elastic material.

Alternatively, the flexible portion or parts thereof may be formed so as to provide the flexible or parts thereof with elasticity.

According to an advantageous embodiment of the invention the flexible portion comprises an elastic material different from the material of the joining portion, if any, and/or from the material of the fixation portion.

Generally, the term "if any" is included to show that the respective embodiment or example may or may not include the part referred to, i.e. the aforementioned part. Here the aforementioned part is the joining portion. Thus it is exemplified that the flexible portion comprises an elastic material different from the material of the joining portion, or different from the fixation portion, or different from the joining portion and the fixation portion; where it is to be understood by the use of "if any", that when the reflector clamping member of this embodiment does not comprise a joining portion, the flexible portion comprises an elastic material different from the material of the fixation portion.

As an example, the elastic material may be a rubber or rubber-like material, such as for example silicone rubber, whereas the joining portion and/or the fixation portion may be made from e.g. polyethylene, such as HDPE, polyethylene terephthalate, or a metal, such as e.g. stainless steel.

According to an advantageous embodiment of the invention the flexible portion comprises an elastic portion formed as a monolithic part with the joining portion, if any, and/or the fixation portion.

According to an advantageous embodiment of the invention the flexible portion comprises an elastic portion formed as a monolithic part with the joining portion, if any, and/or the fixation portion, the elastic portion having dimensions providing elasticity for fixate the ultrasound reflector by clamping.

Thus, in one embodiment the flexible portion may comprise or be formed by the same material as the joining portion, if any, and/or the fixation portion.

As used herein the term "monolithic" is intended to mean something which is formed from the same material as one single unipartite part, as opposed to being assembled from two or more parts, i.e. as being formed or composed of material without joints or seams. In some embodiments it may refer to pieces which are molded as a single part.

According to an advantageous embodiment of the invention the reflector clamping member is adapted for, in assembled configuration, exerting a force on the ultrasound reflector, said force having a component in the direction of the flow conduit insert.

One advantage of the above embodiment may be that by exerting the force on the ultrasound reflector in the direction of the flow conduit insert, or at least having a component in that direction, the ultrasound reflector may be effectively clamped between the flow conduit insert and the reflector clamping member.

According to an advantageous embodiment of the invention at least the joining portion and the fixation portion is formed as a monolithic part.

According to an advantageous embodiment of the invention the joining portion, if any, the fixation portion, and the flexible portion is formed as a monolithic part.

According to an advantageous embodiment of the invention the joining portion, if any, the fixation portion, and the flexible portion is formed from the same material.

According to an advantageous embodiment of the invention the flexible portion comprises or consists of a material selected from the group consisting of plastics, such as polyethylene, hereunder HDPE, or such as polyethylene terephthalate, metals, or composite materials, such as a glass reinforced polymer, such as polybutylene sulfide (PBS).

In some embodiments the flexible portion is formed as a monolithic part with the joining portion, if any, and the fixation portion, and wherein the flexible portion, the joining portion, if any, and the fixation portion comprises or consist of a material selected from the group consisting of plastics, such as polyethylene, hereunder HDPE, or such as polyethylene terephthalate, metals, or composite materials, such as a glass reinforced polymer, such as polybutylene sulfide (PBS).

In a further embodiment the flexible portion is made of a different material than the joining portion, if any, and/or the fixation portion, where the flexible portion comprising or consisting of a material selected from the group consisting of plastics, such as polyethylene, hereunder HDPE, or such as polyethylene terephthalate, metals, or composite materials, such as a glass reinforced polymer, such as polybutylene sulfide (PBS).

According to an embodiment of the invention the joining portion, if any, and/or the fixation portion comprises or consists of a material selected from the group consisting of plastics, such as polyethylene, hereunder HDPE, or such as polyethylene terephthalate, metals, or composite materials, such as a glass reinforced polymer, such as polybutylene sulfide (PBS).

According to an advantageous embodiment of the invention the flexible portion comprises or consists of a composite material, such as a glass reinforced polymer, such as polybutylene sulfide (PBS).

According to an embodiment of the invention the joining portion, if any, and/or the fixation portion comprises or consists of a composite material, such as a glass reinforced polymer, such as polybutylene sulfide (PBS).

According to an advantageous embodiment of the invention the flexible portion comprises a layer of an elastic material, such rubber or a rubber-like material, such as silicone rubber.

Thus, as can be seen various options exists for producing the reflector clamping member and the parts thereof. Moreover, in any specific situation, several considerations may be taken into account, depending on the specific circumstances, when choosing the material for the reflector clamping member, hereunder product costs, flexibility and elasticity, heat resistance, toxicity, friction etc. For example, when using the reflector clamping member in an ultrasonic flow meter used as a water meter or similar, the material should be chosen to ensure non-contamination of the drinking water. Furthermore, to keep the production costs down, it may be beneficial to consider cost-effective materials, while at the same time considering that sufficient quality, including long-term endurance. Finally, the material, especially that of the flexible part, should advantageously be chosen so as to ensure sufficient friction with the ultrasound reflector so as to prevent the ultrasound reflector from moving too much.

According to an advantageous embodiment of the invention the flexible portion comprises one or more elastic pins.

One advantage of the above embodiment may be that the reflector clamping member may provide a quite effective clamping of ultrasound reflectors while at the same time the production of the reflector clamping member may be carried out in a relatively simple and cost-effective manner.

The elastic pins may be arranged to exerting a force, in assembled configuration, on the ultrasound reflector, said force having a component in the direction of the flow conduit insert. For example, the elastic pins may be formed from a material with a relatively low bulk elasticity, where the elasticity is provided by reduced dimensions of the pins, i.e. by having pins which are relatively thin and which therefore can move e.g. sideways with sufficient elasticity.

According to an advantageous embodiment of the invention said flexible portion comprises one or more shear springs.

For example, the one or more elastic pins may form the one or more shear springs.

In the present context the term "shear spring" is intended to mean a spring adapted for being elastically deformed in a direction orthogonal to the longitudinal direction of the spring. It should of course be understood that when deforming the shear spring from its unloaded position, the direction of further deformation may change, but still comprises a primary component in the direction orthogonal to the longitudinal direction of the spring in its unloaded position.

A shear spring may for example be a flat cantilever spring.

According to an advantageous embodiment of the invention each of the one or more elastic pins is adapted to be in a first, un-deformed configuration when the reflector clamping member is free of contact with the ultrasound reflector, and to be in a second deformed configuration when the reflector clamping member is installed to fixate the ultrasound reflector to the flow conduit insert.

According to an advantageous embodiment of the invention the one or more elastic pins, when in the first, un-deformed configuration, have a longitudinal direction having an angle relative to a reflecting surface of the ultrasound reflector in assembled configuration, said angle being less than 20 degrees, such as less than 10 degrees, such as less than 5 degrees.

Thus, in an embodiment the longitudinal direction has a primary component being substantially parallel to the reflecting surface of the ultrasound reflector.

In an example embodiment said longitudinal direction is substantially parallel to said reflecting surface of the ultrasound reflector.

According to an advantageous embodiment of the invention the flexible portion comprises a structured surface.

According to an example embodiment of the invention the structured surface comprises forming elevated surface structures such as flexible peaks or ridges, e.g. non-rigid spikes, undetached chips or grind marks, on a surface.

In the present context it should be understood that the elevated surface structures may be organized partly of fully into a certain pattern, or may be partially or fully randomized in size, dimensions, distances, etc.

Methods usable for making a structured surface may include molding or subsequent machining, or even a combination thereof.

According to an advantageous embodiment of the invention, the structured surface comprises at least one structure having a diameter of between 50 and 500 micrometer, such as between 75 and 300 micrometer, such as between 100 and 200 micrometer.

Thus, in some embodiments, the structured surface may comprise several or a plurality of surface structures, e.g. as a combination of one or more structures having the specified size and further structures with diameter below 50 micrometer, or as one or more structures having a diameter between 50 and 500 micrometers as specified. Accordingly, in one embodiment, the structured surface has a single surface structure.

According to an advantageous embodiment of the invention reflector clamping member is adapted to clamp the ultrasound reflector being substantially flat.

According to an advantageous embodiment of the invention reflector clamping member is adapted to clamp the ultrasound reflector being focusing.

Focusing reflectors may in an embodiment comprise a concave reflecting surface.

According to an advantageous embodiment of the invention the reflector clamping member is adapted to at least partly close an opening in the flow conduit insert when in assembled configuration.

According to an advantageous embodiment of the invention the reflector clamping member is adapted to form, together with the flow conduit insert, a body having a substantially cylindrical outer surface.

The invention further relates to a flow conduit insert assembly comprising a flow conduit insert for inserting into a flow conduit of an ultrasonic flow meter, at least one ultrasound reflector, and at least one reflector clamping member according to the invention or any of its embodiments for fixating the ultrasound reflector to the flow conduit insert.

In the present context, the flow conduit of an ultrasonic flow meter is to be understood as a part of the pipe, tube or other channel through which the fluid to be measured flows, particularly the part where the flow measurements takes place. In some embodiments, the flow conduit may be a separate section of e.g. the pipe, and may thus be provided with the finished ultrasonic flow meter. Then, such flow conduit may typically comprise a connection arrangement at each end for connecting to the rest of the piping system, e.g. a connection arrangement comprising an inner or outer thread.

In an embodiment, the flow conduit insert may be inserted axially into the flow conduit.

I.e. in such embodiments, the flow conduit insert, and thus also the flow conduit insert assembly, may be inserted along the longitudinal axis of the flow conduit. Thus, the longitudinal axis of the flow conduit insert assembly and the longitudinal axis of the flow conduit may, during and/or after assembly substantially overlap.

The invention further relates to an ultrasonic flow meter comprising a flow conduit, a housing fixable to the flow conduit, a flow conduit insert inserted into the flow conduit, an ultrasound reflector, and a reflector clamping member according to the invention or any of its embodiments arranged to clamp the ultrasound reflector between the flexible portion and the flow conduit insert thereby fixating the ultrasound reflector to the flow conduit insert.

The invention further relates to a method of fixating an ultrasound reflector to a flow conduit insert, the method comprising the steps of providing a reflector clamping member comprising a flexible portion, contacting said flexible portion to one side of said ultrasound reflector, fixating said reflector clamping member to said flow conduit insert thereby clamping the ultrasound reflector between said flexible portion and said flow conduit insert.

According to an embodiment of the invention, the reflector clamping member used in the above mentioned method is formed according to the invention or any of its embodiments.

The invention further relates to a use of a reflector clamping member comprising a flexible portion for fixating an ultrasound reflector to a flow conduit insert of an ultrasonic flow meter.

According to an advantageous embodiment of the invention the used the reflector clamping member is the reflector clamping member according to the invention or any of its embodiments and/or where the use is in an ultrasonic flow meter according to the invention or any of its embodiments.

THE FIGURES

The invention will now be described with reference to the figures where

Figure 1B:
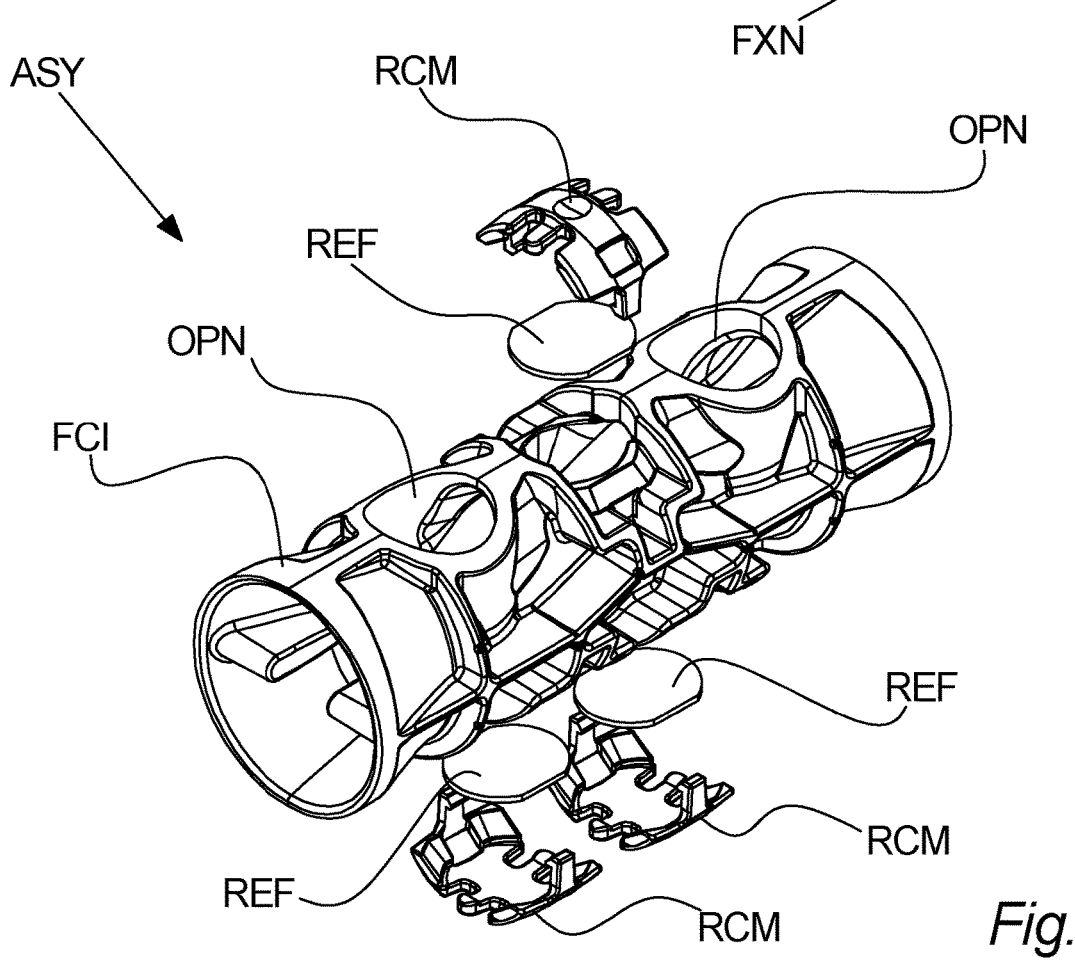
Figure 2A:
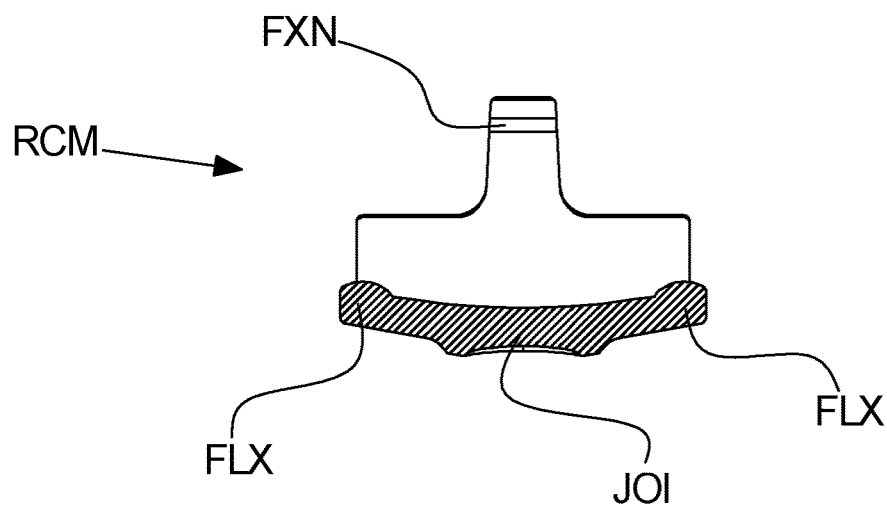
Figure 2B:
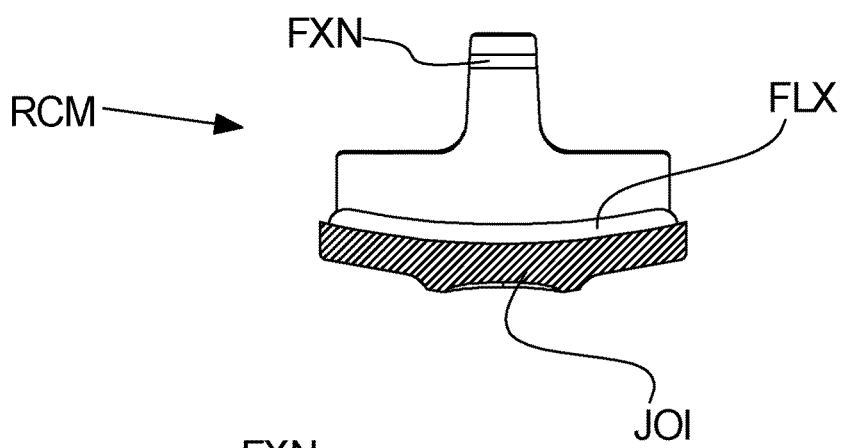
Figure 2C:
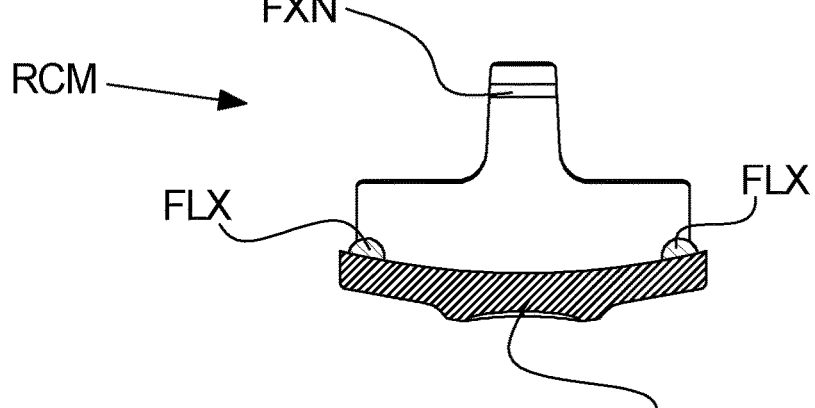
Figure 2D:
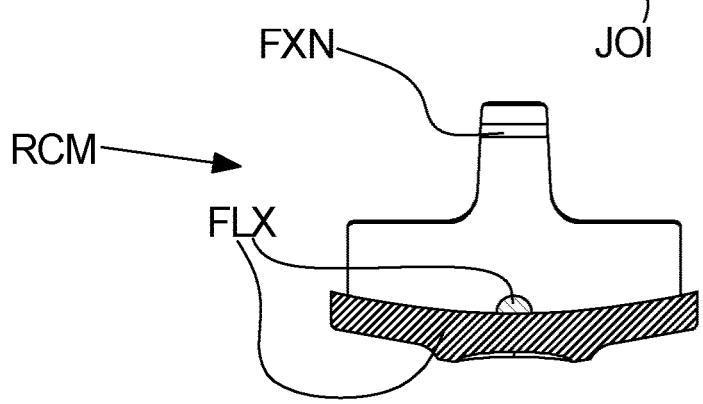
Figure 3A:
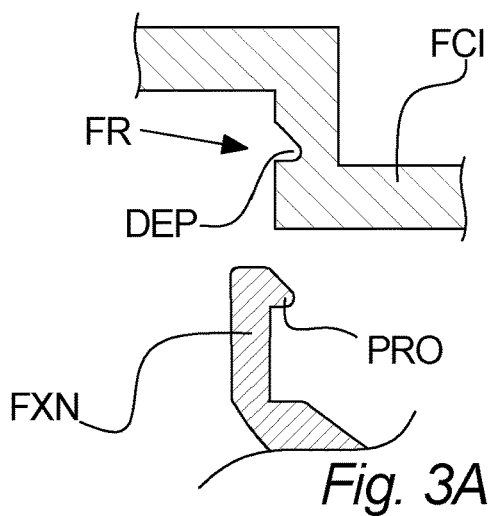
Figure 3B:
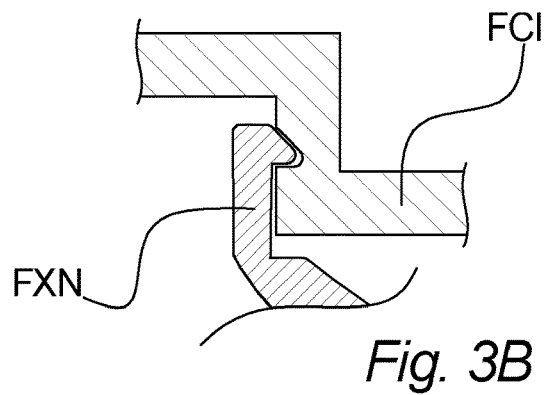
Figure 3C:
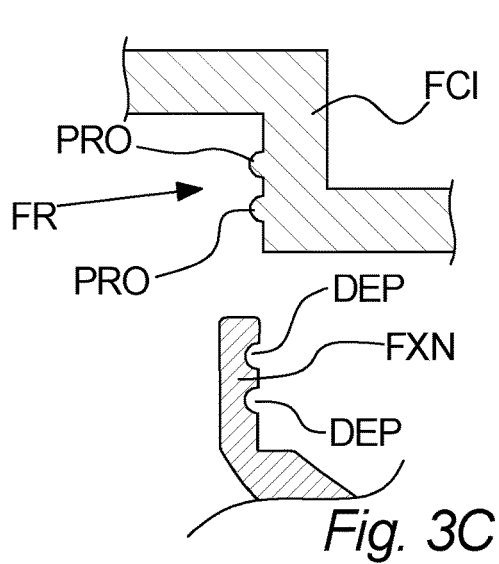
Figure 3D:
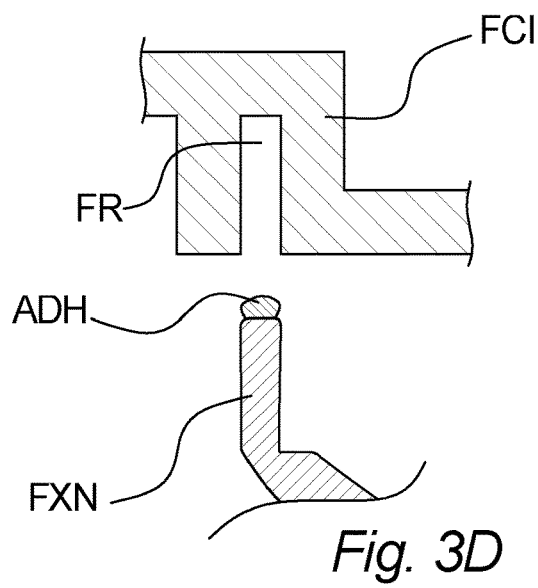
Figure 3E:
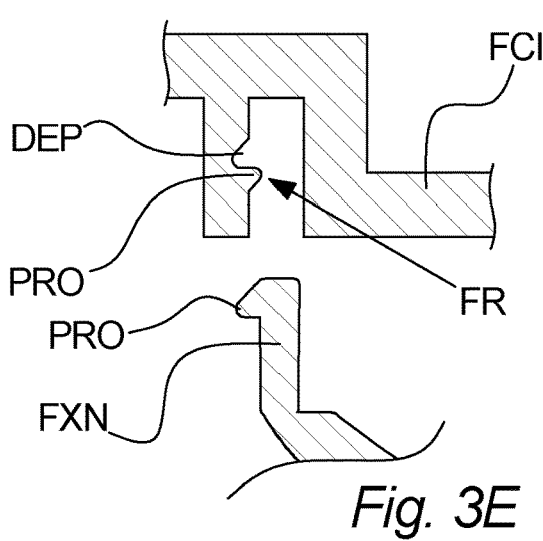
Figure 3F:
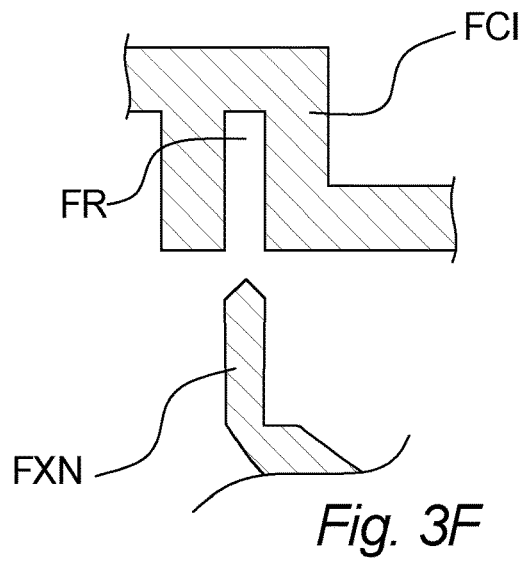
Figure 4A:
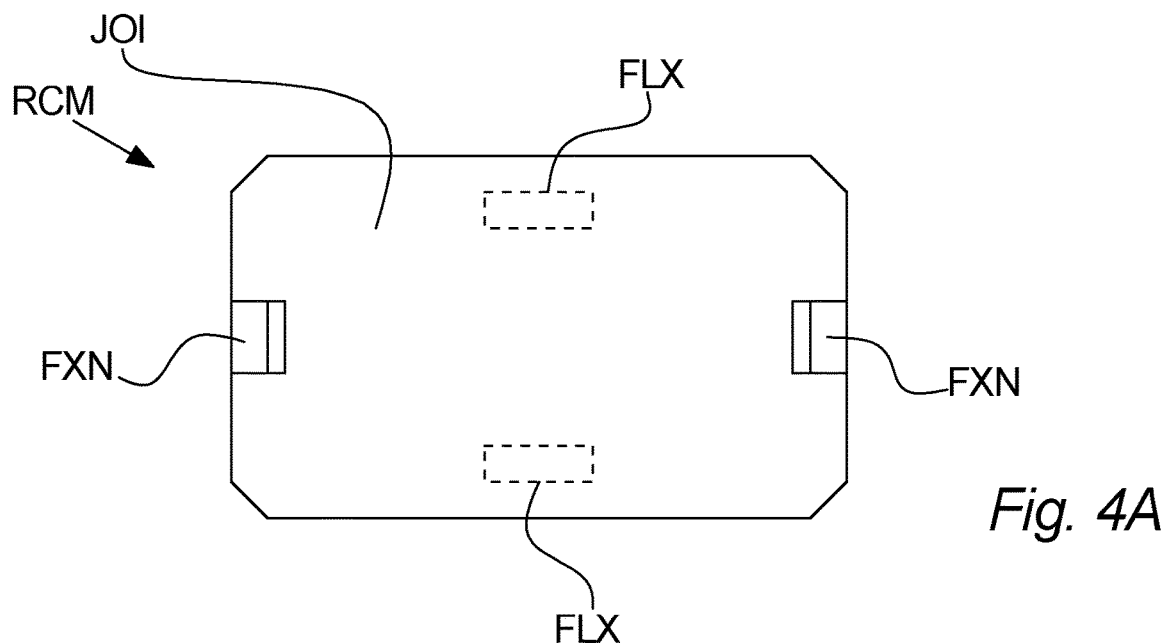
Figure 4B:
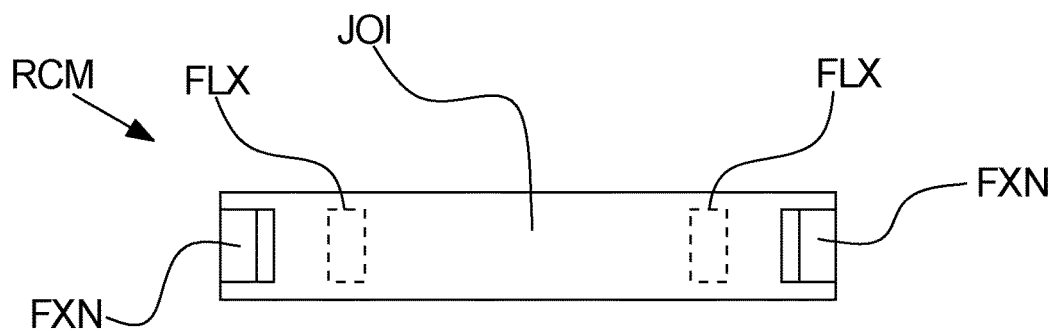
Figure 4C:
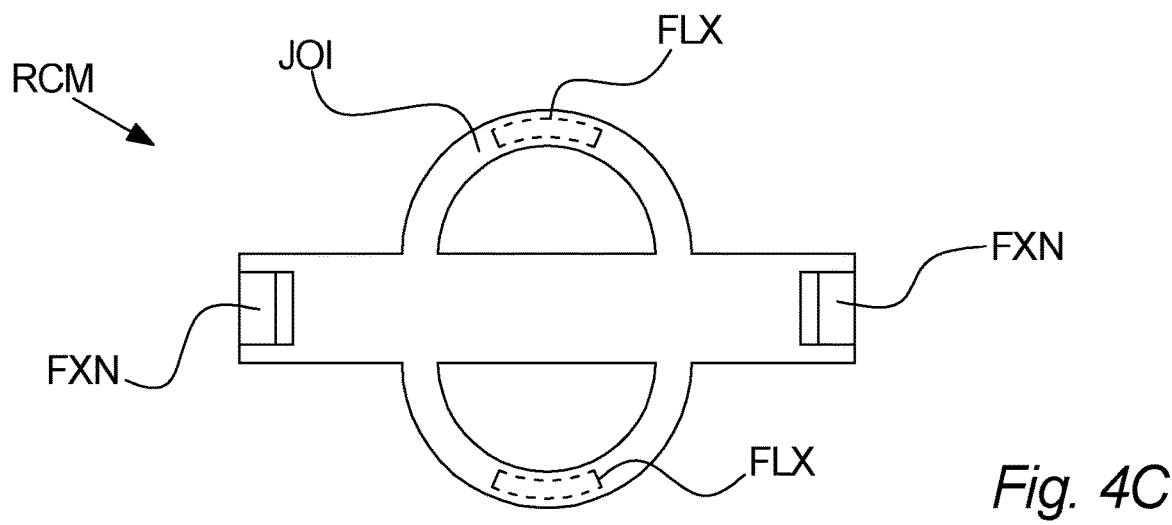
Figure 5:
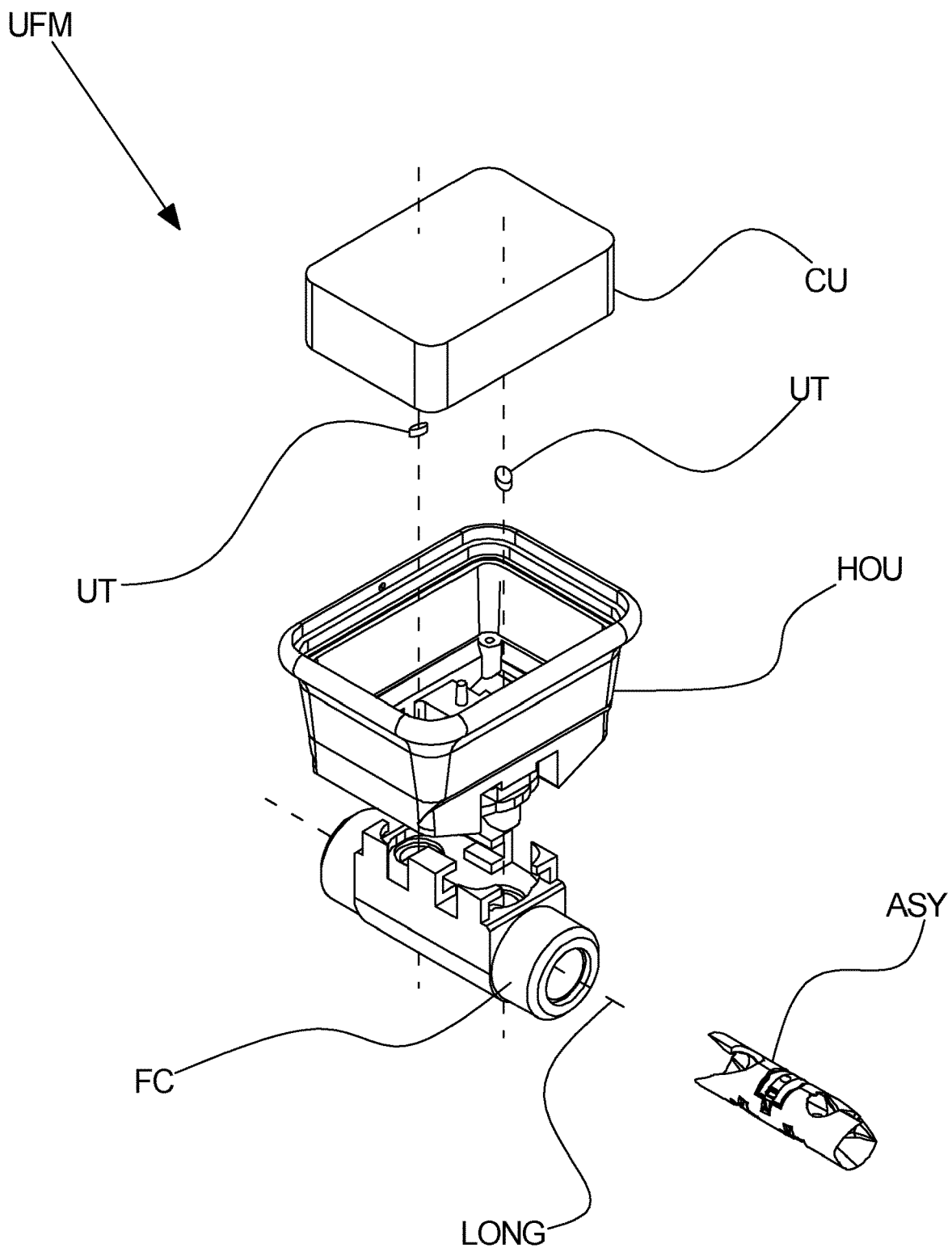

FIG. 1A illustrates a reflector clamping member according to an embodiment of the invention, FIG. 1B illustrates a flow conduit insert assembly comprising a reflector clamping member according to an embodiment of the invention, FIG. 2A-D illustrate reflector clamping members with various flexible portions according to embodiments of the invention, FIG. 3A-F illustrate various fixation portions and corresponding fixation receivers according to embodiments of the invention, FIG. 4A-C illustrate reflector clamping members with various joining portions according to embodiments of the invention, and FIG. 5 illustrates an ultrasonic flow meter comprising a flow conduit insert assembly according to an embodiment of the invention.

DETAILED DESCRIPTION

Referring to FIGS. 1A and 1B, a reflector clamping member RCM according to an embodiment of the invention is illustrated. In more detail, FIG. 1A shows a perspective view of a reflector clamping member RCM with a corresponding ultrasound reflector REF, with a distance between the two. Furthermore, FIG. 1B shows an exploded perspective view of a flow conduit insert assembly ASY comprising the reflector claiming members RCM shown in FIG. 1A.

The reflector clamping member RCM shown on FIG. 1A is adapted to fixate an ultrasound reflector REF to a flow conduit insert FCI of an ultrasonic flow meter UFM. The flow conduit insert FCI is shown on FIG. 1B. When the reflector clamping member(s) RCM, the ultrasound reflector (s) REF and the flow conduit insert FCI are assembled, they form a flow conduit insert assembly ASY, which may thus be inserted into a flow conduit FC of an ultrasonic flow meter UFM. An example thereof is illustrated on FIG. 5 and the corresponding description.

The reflector clamping member RCM comprises a fixation portion FXN for fixating the reflector clamping member RCM to the flow conduit insert FCI and a flexible portion FLX for contacting the ultrasound reflector REF.

The illustrated reflector clamping member RCM further comprise a joining portion JOI for joining the fixation portion FXN and the flexible portion FLX; however, in other embodiments the reflector clamping member RCM does not comprise a separate joining portion JOI, e.g. if the flexible portion FLX and the fixation portion FXN are directly joined to each other.

The flexible portion FLX is adapted for supporting at least one side of the ultrasound reflector REF so as to clamp the ultrasound reflector REF between the flexible portion FLX and the flow conduit insert FCI when the reflector clamping member RCM, the ultrasound reflector REF, and the flow conduit insert FCI are assembled.

In other words, when the reflector clamping member RCM is fixated to the flow conduit insert FCI, the ultrasound reflector REF may be clamped between the reflector clamping member RCM and the flow conduit insert FCI, and more specifically between the flexible portion FLX and the flow conduit insert FCI.

The flexible portion FLX may be devised in various ways, some of which are exemplified on FIGS. 2A-2D, as long as it can contact the ultrasound reflector REF and support at least one side of the ultrasound reflector REF so as to clamp the ultrasound reflector REF between the flexible portion FLX and the flow conduit insert FCI, as described above.

Furthermore, the fixation portion FXN may be devised in various ways, some of which are exemplified in FIGS. 3A-3F, as long as it can fixate the reflector clamping member RCM to the flow conduit insert FCI.

The joining portion JOI may also be devised in a number of different ways, some of which are exemplified on FIGS. 4A-C, as long as it joins the fixation portion FXN and the flexible portion FLX. Alternatively, as stated above, the reflector clamping member RCM may be without a separate joining portion JOI.

Referring to FIG. 2A, a reflector clamping member RCM according to an embodiment of the invention is illustrated. FIG. 2A shows a cross-sectional side view of the reflector clamping member, which is shown in FIGS. 1A-1B.

The reflector clamping member RCM comprises a flexible portion FLX, which in the embodiment illustrated on FIG. 2A is formed by two elastic pins. In some other embodiments, fewer or more elastic pins may be sufficient, dependent on e.g. the exact type of elastic pin(s) and on the position and orientation thereof. For example, if the support of the ultrasound reflector REF must be extraordinarily strong, e.g. due to the intended environment of the ultrasonic flow meter UFM, an increased number of elastic pins may be used, or the elastic pins and/or the tangential contact section between the elastic pins and the ultrasound reflector REF may be made broader.

In FIG. 2A, an example of elastic pins is shown in an un-deformed configuration. The elastic pins shown in FIG. 2A function as cantilever springs, which can deform in a direction away from the flow conduit insert FCI when the reflector clamping member RCM, the ultrasound reflector REF, and the flow conduit insert FCI is assembled to form a flow conduit insert assembly ASY. For example, the elastic pins may be oriented such that they have a longitudinal direction with an angle relative to a reflecting plane of an ultrasound reflector REF, where that angle is less than 40 degrees, such as less than 20 degrees; here in FIG. 2A illustrated as about 10 degrees. Moreover, the elastic pins may be dimensioned such that when in assembled configuration (i.e. where the ultrasound reflector REF, the reflector clamping member RCM, and the flow conduit insert FCI are assembled to form a flow conduit insert assembly ASY) the longitudinal direction of the elastic pins may be substantially parallel to the reflecting plane of the ultrasound reflector REF, thus maximizing the elasticity of the elastic pins in assembled configuration. Alternatively, is should be ensured that the angle between the longitudinal direction of the elastic pins and the reflecting plane of an ultrasound reflector REF is, in assembled configuration, not too large, such as e.g. below 40 degrees, or below 20 degrees. In FIG. 2A, the reflecting plane of an ultrasound reflector REF would be substantially horizontal. The ultrasound reflector plane is herein considered as the plane spanned by the ultrasound reflector REF when the ultrasound reflector REF has been brought into contact with the flexible portion FLX.

Referring to FIG. 2B, a reflector clamping member RCM according to an embodiment of the invention is illustrated.

The reflector clamping member RCM comprises a flexible portion FLX, which in the embodiment illustrated on FIG. 2B is formed by a layer comprising a flexible or elastic material. For example, the layer may be a silicone rubber layer.

It should be noticed that in some embodiments the flexible portion FLX may not necessarily be fixated to the joining portion JOI, but must still be supported by the joining portion JOI at least when in an assembled configuration with an ultrasound reflector REF and a flow conduit insert FCI. Particularly, when using a flexible or elastic layer, such as a layer of silicone rubber, this layer may in some embodiments not be fixated to the joining portion JOI. This may also be the case if the flexible portion is or comprises a flexible ring, such as an O-ring of rubber or rubber-like material.

As illustrated in FIG. 2B, the layer is slightly curved. Thus, if the surface of the ultrasound reflector REF for contacting the flexible portion FLX is similarly curved, a full part or at least a large part of the ultrasound reflector may be contacted by the layer; however, if the ultrasound reflector REF has a curvature differing from that of the illustrated surface or if the ultrasound reflector is substantially flat, then the point of contact between the ultrasound reflector REF and the flexible portion may be only be along e.g. the rim of the layer, i.e. as a circle of contact.

Referring to FIG. 2C, a reflector clamping member RCM according to an embodiment of the invention is illustrated.

This embodiment is somewhat similar to that shown in FIG. 2B; however, instead of using a layer of flexible or elastic material, the flexible portion FLX is formed as a ring of a flexible or elastic material, for example a rubber O-ring.

Referring to FIG. 2D, a reflector clamping member RCM according to an embodiment of the invention is illustrated.

In this embodiment, the flexible portion FLX comprises a structured surface. In the illustrated embodiment, the structured surface is made up from a single structure, whereas structured surfaces of other embodiments may comprise more than one surface structures, e.g. to improve balance of the ultrasound reflector REF. The structure of the structured surface may for example be made via processes of molding or machining, or a combination of molding and subsequent machining. Typical sizes of surface structures may be between 50 and 500 micrometer, such as e.g. round 100-200 micrometers. The structured surface may also be made with other means, provided that sufficient flexibility or elasticity is induced by incorporating the structured surface into the flexible portion.

In the illustrated embodiment, the flexible portion FLX comprises a single, centered surface structure, which may be made of a relatively hard material. The flexible portion FLX further comprises a portion which both connects the surface structure with the fixation portion FXN and which also provides sufficient flexibility for the surface structure to move relative to the fixation portion FXN assembled with the ultrasound reflector REF and the flow conduit insert FCI. Thereby, in that particular embodiment, the flexible portion FLX comprises one part for contacting the ultrasound reflector REF and another part for providing flexibility. Since the flexible portion FLX and the fixation portion FXN is directly joined in this embodiment, there is no joining portion JOI. Thus, even if the part providing flexibility may be somewhat similar to the joining part of FIG. 2C, the embodiment illustrated on FIG. 2D is free of any separate joining portions JOI.

In other embodiments where the flexible portion FLX comprises a structured surface, the structured surface may comprise one or more surface structures providing flexibility or elasticity.

The above described reflector clamping member RCM and flexible portion FLX thereof according to any of FIGS. 2A-2D are applicable in the embodiment illustrated on FIGS. 1A-B.

Now referring to FIGS. 3A-3F, fixation portions FXN according to various embodiments of the invention are illustrated. Each of the illustrated fixation portions FXN are applicable with the reflector clamping member RCM described in relation to FIGS. 1A-1B. It should be noted that no ultrasound reflectors REF are shown in FIGS. 3A-3F, nor are any corresponding flexible portions FLX shown. Nevertheless, these elements would be present and some possibilities are illustrated in that respect on FIGS. 1A-1B and 2A-2D.

In FIGS. 3A-3B, a fixation portion FXN of a reflector clamping member RCM and a corresponding fixation receiver FR of a flow conduit insert FCI are shown in a disassembled configuration. The same are shown in FIG. 3B, only in an assembled configuration. The fixation portion FXN of shown comprises an arm with a protrusion PRO, whereas the fixation receiver FR is formed as a depression DEP formed so as to receive and engage the protrusion PRO, as shown in FIG. 3B. Alternatively, the fixation receiver FR may be formed as a protrusion for engaging the protrusion of the fixation portion FXN, or as a combination of a protrusion and a depression. Furthermore, in some embodiments, the fixation portion FXN may instead comprise a depression, and the fixation receiver FR may comprise a protrusion.

The fixation portion FXN and corresponding fixation receiver FR of FIGS. 3A-3B may be used with any of the flexible portions illustrated on FIGS. 2A-2D.

Moving to FIG. 3C, a further example of a fixation portion FXN and corresponding fixation receiver FR is illustrated according to an embodiment. Here the fixation portion FXN comprises two depressions DEP, whereas the fixation receiver FR comprises two corresponding protrusions PRO.

The position of the protrusions and depressions may in some embodiments be reversed with respect to the fixation portion FXN and the fixation receiver FR.

The number of protrusions and corresponding depressions may be some embodiments vary, and may be thus be e.g. three, four or five. In some embodiments the number of protrusions may not be the same as the number of depressions; as an example one protrusion may be combined with two, three, or more depressions.

The illustrated fixation portion FXN and corresponding fixation receiver FR may thus allow two different assembled configurations; a first assembled configuration where the lower protrusion PRO of the fixation receiver FR engages the upper depression DEP of the fixation portion FXN; and a second assembled configuration where the upper depression DEP and upper protrusion PRO engages each other and where also the lower depression DEP and lower protrusion PRO engages each other. Even if this allows two different possible assembled configurations, a beneficial implementation of the flexible portion FLX may still impart flexibility and thus improve the clamping over time of the ultrasound reflector REF.

The fixation portion FXN and corresponding fixation receiver FR of FIG. 3C may be used with any of the flexible portions illustrated on FIGS. 2A-2D.

Further, on FIG. 3D a further combination of a fixation portion FXN and a fixation receiver FR is illustrated according to an embodiment of the invention.

Here, the fixation portion FXN and the fixation receiver FR are fixated to each other by an adhesive ADH, illustrated in FIG. 3D as a drop of adhesive ADH applied on the end of the fixation portion FXN. The adhesive ADH may be applied on other parts of the fixation portion FXN, or it may be applied on the fixation receiver FR or on both.

The dimensions of the fixation portion FXN and/or of the fixation receiver FR may thus determine the exact relative position of the assembly formed by assembling the fixation portion FXN and the fixation receiver FR.

In some embodiments, the fixation portion FXN, here illustrated as an arm, may e.g. be inserted into the bottom of the fixation receiver FR, here illustrated as a hole. In some other embodiments, the fixation portion FXN may be fixated along a continuous range of positions relative to the fixation receiver FR; however, even in such embodiments, the flexible portion FLX may still ensure an effective fixation of the ultrasound reflector REF over time.

The fixation portion FXN and corresponding fixation receiver FR of FIG. 3D may be used with any of the flexible portions illustrated on FIGS. 2A-2D.

Moreover, on FIG. 3E a further combination of a fixation portion FXN and a fixation receiver FR is illustrated according to an embodiment of the invention.

This embodiment illustrates that the direction of the protrusion(s) and depression(s) may be varied, as this FIG. 3E shows a protrusion PRO facing away from the center of the reflector clamping member RCM, whereas FIGS. 3A-3B shows a protrusion PRO facing towards the center of the reflector clamping member RCM, at least in the sense that it is towards a center axis of the reflector clamping member RCM. Also, FIG. 3E illustrates that a protrusion PRO, here shown on the fixation portion FXN may engage a combination of a protrusion PRO and a depression DEP, here shown on the fixation receiver FR.

The fixation portion FXN and corresponding fixation receiver FR of FIG. 3E may be used with any of the flexible portions illustrated on FIGS. 2A-2D.

Finally, on FIG. 3F a further combination of a fixation portion FXN and a fixation receiver FR is illustrated according to an embodiment of the invention.

This embodiment illustrates that ultrasonic welding may also be used for connecting the reflector clamping member RCM to the flow conduit insert FCI and thus fixating it thereto. Ultrasonic welding may be employed by ensuring that the ultrasonic signal used for ultrasonic welding passes through a narrowed or restricted zone, in FIG. 3F shown as a pointed tip of the fixation portion FXN. Thus, the pointed tip would be moved upwards, as shown in FIG. 3F, and brought into contact with the fixation receiver FR, after which the ultrasonic welding would be applied. The process of ultrasonic welding may also cause inaccuracies in the relative distance between the reflector clamping member RCM and the flow conduit insert FCI, e.g. due to manufacturing tolerances of the parts but also due to the process of ultrasonic welding itself, e.g. due to local melting. Such inaccuracies or variations in that relative distance may cause the fixation of the ultrasound reflector to be less effective. Moreover, the mentioned relative distance may over time change, due to various aging effects.

The fixation portion FXN and corresponding fixation receiver FR of FIG. 3F may be used with any of the flexible portions illustrated on FIGS. 2A-2D.

Now, referring to FIGS. 4A-4C, various joining portions JOI are illustrated according to different embodiments. The illustrated reflector clamping members RCM are shown in a top-down view. Each of the illustrated joining portions JOI is applicable with the reflector clamping member RCM described in relation to FIGS. 1A-1B.

A possible position of two flexible portions FLX is illustrated on each of FIGS. 4A-4C; however, the number as well as the position of the flexible portion(s) FLX may be varied according to the specific circumstances.

On FIG. 4A, the joining portion JOI extends between the two fixation portions FXN but also forms a form of cover, which may fully or partly cover the ultrasound reflector REF. This cover may have different shapes, which may deviate from that illustrated in FIG. 4A. Thus, the cover formed by the joining portion JOI may in some embodiments close a corresponding opening in the flow conduit insert FCI when assembled therewith.

On FIG. 4B another version of the joining portion JOI is illustrated. Here the joining portion JOI connects the flexible portions FLX as well as the fixation portions FXN without forming a cover.

The illustrated configuration of the joining portion JOI somewhat limits the possible positions of the flexible portion(s) FLX, but this configuration may still in some situations be advantageous, e.g. due to design simplicity or minimization of used material.

FIG. 4C illustrates yet another version of the joining portion JOI. The illustrated joining portion JOI comprises, further to the joining portion JOI of FIG. 4B, two semi-circular bridges, which allows for more freedom with respect to the position of the flexible portions FLX, as also illustrated on FIG. 4C.

Each of the above illustrated reflector clamping members RCM has two fixation portions FXN. However, depending on the specific situation and corresponding requirements and also desired simplicity, it may in some situations be sufficient with only a single fixation portion FXN, whereas it may in other situations be desirable with more than two fixations portions FXN, such as e.g. three, four, or more.

Here it should be understood that each of the illustrated joining portions JOI may be combined with each of the illustrated flexible portions of FIG. 2A-2C and with each of the fixation portions FXN illustrated in FIGS. 3A-3F.

Now, referring to FIG. 5, an ultrasonic flow meter UFM and a flow conduit insert assembly ASY is illustrated according to an embodiment of the invention.

The ultrasonic flow meter UFM comprises a flow conduit FC, a flow conduit insert assembly ASY, a housing HOU, two ultrasonic transducers UT, and a control unit CU.

The ultrasonic flow meter UFM may for example be a transit-time ultrasonic flow meter.

In some embodiments the flow conduit insert assembly ASY is a self-supporting assembly, whereas it may need support from the flow conduit FC and/or the housing HOU in other embodiments.

The ultrasonic flow meter UFM may in some embodiments comprise further components, such as a display or a transmission unit for communicating with external devices or systems. Also, in some embodiments the control unit CU may be a fully integrated unit, and may optionally comprise one or more further components integrated therewith, whereas the control unit CU may in other embodiments be a distributed system in the ultrasonic flow meter UFM, i.e. the control unit CU may comprise several subunits which are electrically connected, but not necessarily as one single component.

The control unit CU is electrically connected with the ultrasonic transducers UT and may thus control the emission of ultrasonic signals therefrom and may also receive electronic signals representing any ultrasonic signals detected by the ultrasound transducer UT.

The housing HOU may be assembled with the flow conduit FC, for example by means of locking pin(s) or other suitable locking arrangements. The housing supports the ultrasonic transducers UT and the control unit CU.

The flow conduit insert assembly comprises a flow conduit insert FCI, at least one ultrasound reflector REF, and at least one reflector clamping member RCM, which may be formed as illustrated on FIGS. 1A-1B. FIG. 5 illustrates the use of three ultrasound reflectors REF, and three corresponding reflector clamping members RCM.

The flow conduit FC as a first and a second, opposite, opening connected to each other to form an inner space to allow passage of the fluid for which flow is measured. The inner space follows longitudinal axis LONG of the flow conduit FC, indicated by the dashed line.

The flow conduit insert assembly ASY is inserted axially into the flow conduit FC. In some embodiments, the longitudinal position of the flow conduit insert assembly ASY relative to the flow conduit FC may be locked by the housing HOU, when connecting the housing HOU with the flow conduit FC, e.g. by protrusions in the housing HOU engaging corresponding depressions and/or openings in the flow conduit FC and possibly also depressions and/or openings in the flow conduit insert FCI.

The reflector clamping member(s) RCM and the flow conduit insert FCI may be devised according to any of the aforementioned figures. Specifically, the reflector clamping member(s) RCM each comprise a flexible portion FLX, which may be formed according to any of FIGS. 2A-2D, a fixation portion FXN, which may be formed according to any of FIGS. 3A-3F, and a joining portion JOI, which may be formed according to any of FIGS. 4A-4C.

LIST OF FIGURE REFERENCES

RCM. Reflector clamping member
REF. Ultrasound reflector
FCI. Flow conduit insert
FXN. Fixation portion
FLX. Flexible portion
JOI. Joining portion
ASY. Flow conduit insert assembly
CON. Flow conduit
UFM. Ultrasonic flow meter
HOU. Housing
OPN. Opening
UT. Ultrasonic transducer
CU. Control unit
LONG. Longitudinal axis of the flow conduit
FR. Fixation receiver
ADH. Adhesive

The invention claimed is:
1. A reflector clamping member for fixating an ultrasound reflector to a flow conduit insert of an ultrasonic flow meter, the reflector clamping member comprising
   a fixation portion for fixating the reflector clamping member to the flow conduit insert and
   a flexible portion for contacting the ultrasound reflector, wherein the flexible portion is adapted for supporting at least one side of the ultrasound reflector so as to clamp the ultrasound reflector between the flexible portion and the flow conduit insert when the reflector clamping member, the ultrasound reflector, and the flow conduit insert are assembled.

2. The reflector clamping member according to claim 1, wherein the reflector clamping member further comprises a joining portion joining the flexible portion and the fixation portion.

3. The reflector clamping member according to claim 1, wherein the flexible portion comprises an elastic portion.

4. The reflector clamping member according to claim 1, wherein the joining portion, the fixation portion, and the flexible portion is formed as a monolithic part.

5. The reflector clamping member according to claim 1, wherein the joining portion, the fixation portion, and the flexible portion is formed from the same material.

6. The reflector clamping member according to claim 1, wherein the flexible portion comprises a layer of an elastic material.

7. The reflector clamping member according to claim 1, wherein the flexible portion comprises one or more elastic pins.

8. The reflector clamping member according to claim 6, wherein each of the one or more elastic pins is adapted to be in
   a first, un-deformed configuration when the reflector clamping member is free of contact with the ultrasound reflector, and to be in
   a second deformed configuration when the reflector clamping member is installed to fixate the ultrasound reflector to the flow conduit insert.

9. The reflector clamping member according claim 1, wherein the flexible portion comprises a structured surface.

10. The reflector clamping member according to claim 9, the structured surface comprises at least one structure having a diameter of between 50 and 500 micrometer.

11. A flow conduit insert assembly comprising
   a flow conduit insert for inserting into a flow conduit of an ultrasonic flow meter,
   at least one ultrasound reflector, and
   at least one reflector clamping member according to claim 1 for fixating the ultrasound reflector to the flow conduit insert.

12. A ultrasonic flow meter comprising
   a flow conduit,
   a housing fixable to the flow conduit,
   a flow conduit insert inserted into the flow conduit,
   an ultrasound reflector, and
   a reflector clamping member according to claim 1 arranged to clamp the ultrasound reflector between the flexible portion and the flow conduit insert thereby fixating the ultrasound reflector to the flow conduit insert.

13. The reflector clamping member according to claim 1, wherein the reflector clamping member is connected to the flow conduit insert by ultrasonic welding.

14. The reflector clamping member of claim 13, wherein the fixation portion has a pointed tip.

15. The reflector clamping member of claim 14, wherein the ultrasonic welding passes the pointed tip.

16. The reflector clamping member according to claim 15, wherein the flow conduit insert has a fixation receiver, and wherein the fixation portion is brought into contact with the fixation receiver, after which the ultrasonic welding is applied.

17. The reflector clamping member of claim 13, wherein the flexible portion comprises a structured surface.

18. The reflector clamping member of claim 17, wherein the structured surface is made up from a single structure.

* * * * *